United States Patent [19]

Deutsch et al.

[11] Patent Number: 4,875,330
[45] Date of Patent: Oct. 24, 1989

[54] ALIGNABLE COTTON CONVEYING STRUCTURE FOR A TRANSVERSELY MOVABLE ROW UNIT

[75] Inventors: Timothy A. Deutsch, Newton; Joel M. Schreiner; Steve H. McBee, both of Ankeny, all of Iowa

[73] Assignee: Deere & Company, Moline, Ill.

[21] Appl. No.: 175,809

[22] Filed: Mar. 29, 1988

[51] Int. Cl.[4] ............................................. A01D 46/16
[52] U.S. Cl. ........................................... 56/41; 56/28
[58] Field of Search ......................... 56/28, 30, 40, 41

[56] References Cited

U.S. PATENT DOCUMENTS

| 2,729,513 | 1/1956 | Swim, Jr. | 302/58 |
| 3,047,996 | 8/1962 | Hubbard | 56/41 |
| 3,757,502 | 9/1973 | Hubbard | 56/41 |
| 4,501,112 | 2/1985 | Thedford et al. | 56/30 |
| 4,660,359 | 4/1987 | Deutsch | 56/13.3 |

FOREIGN PATENT DOCUMENTS

| 477691 | 6/1925 | U.S.S.R. | 56/41 |
| 520071 | 10/1976 | U.S.S.R. | 56/30 |

OTHER PUBLICATIONS

U.S. Patent Application Serial No. 087,073 filed Aug. 19, 1987 entitled Support Arrangement for Cotton Harvester Row Units by Steve Allan Junge et al (13345).
U.S. Patent Application Serial No. 087,075 filed Aug. 19, 1987 entitled Molded Cotton Door and Mounting Structure Therefor by Timothy A. Deutsch et al (13344).
U.S. Patent Application Serial No. 935,460 filed Nov. 26, 1986 entitled Cotton Harvester and Tandem Row Unit Therefor by Timothy A. Deutsch et al (13209).

Primary Examiner—John Weiss

[57] ABSTRACT

Row unit and conveying structure for a cotton harvester having transversely rollable row units adapted for opening up the area between units to provide access to the harvesting mechanisms for servicing. The inner row units on the harvester include suction door structure which is supported from the row unit support frame and remains stationary as the row unit is rolled transversely. The row unit includes compartment structure fabricated from individually removable panels to define a cotton path extending in the fore-and-aft direction alongside the spindle drums and which opens at the lower rear end of the row unit into the suction door. The opening automatically aligns with the suction door as the row unit is rolled back to the row-harvesting position. The outer row units include duct support structure mounted on the unit support frame, and the suction door is connected directly to the row unit for transverse movement therewith. The duct support provides a transition area between the upper cotton conveying structure and the upper door structure and permits the outer unit to be rolled transversely without disconnecting ducts. Upon movement of the row unit back to the harvesting position, the upper door structure automatically aligns with the duct support structure. Therefore, servicing of the units can be accomplished without unfastening doors and ducts.

19 Claims, 4 Drawing Sheets

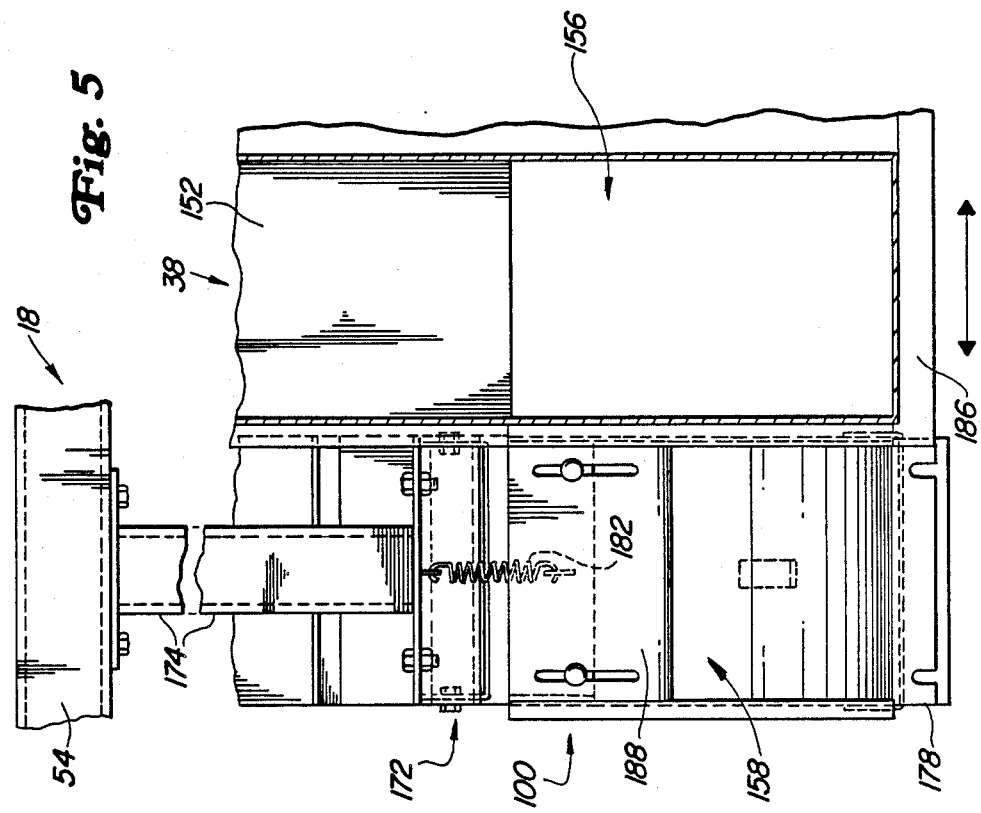
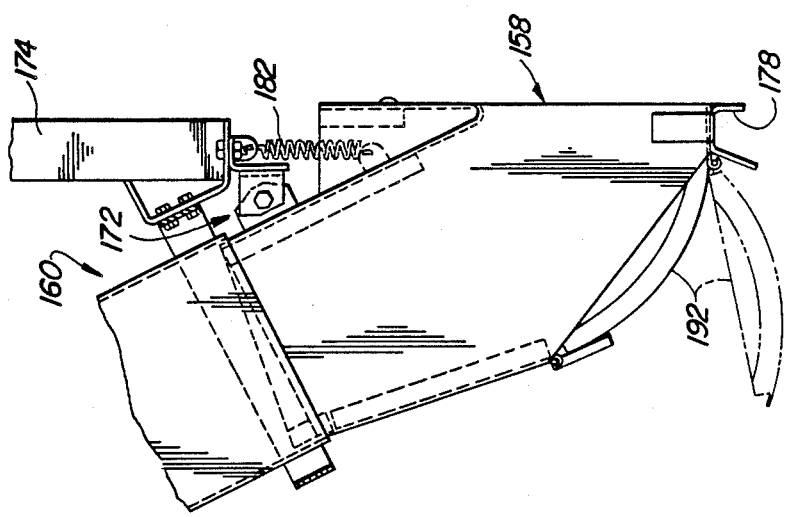

ALIGNABLE COTTON CONVEYING STRUCTURE FOR A TRANSVERSELY MOVABLE ROW UNIT

BACKGROUND OF THE INVENTION

The present invention relates generally to cotton harvesters, and more specifically to the cotton conveying structure associated with the row units on a cotton harvester.

A typical cotton harvester includes a plurality of row harvesting units transversely supported on a forward lift frame. Each row unit includes harvesting structure for removing the cotton from the plants and conveying structure for conveying the cotton from the row units to a basket on the harvester. Frequently it is necessary to move the row units to service the implement. This servicing usually involves removal of a portion of the conveying structure to gain access to certain areas of the row unit and to permit the row unit to be moved. Such structure, is shown for example in co-pending application Ser. No. 087,073 filed 19 Aug. 1987, and of common ownership with the present application. That application shows a cotton harvester of the spindle type having a plurality of row units, each with upright picking drums and doffer means for directing picked cotton transversely into narrow side suction door structure. An air duct system extends upwardly and rearwardly from the door structure to convey the cotton to the basket on the harvester frame. The row units are mounted so that they may be rolled transversely on the front unit support lift frame so that adjacent row units can be moved apart for access to the areas which require servicing. One problem with such structure is that the air duct system above the row unit must be removed prior to rolling the units apart. Removing the ducts is awkward and increases the time required for servicing the units. Servicing may also require that all or portions of the door structure be removed from the unit for better access to certain areas. This, too, can be a cumbersome and time-consuming task.

BRIEF SUMMARY OF THE INVENTION

It is therefore an object of the present invention to provide an improved cotton conveying structure for a cotton harvester. It is yet another object to provide such a structure which includes removable panel compartment structure with a forward air jet for efficiently conveying cotton rearwardly in a narrow path alongside the row unit to rear duct structure.

It is another object of the present invention to provide an improved row unit structure for a cotton harvester wherein the row unit is transversely adjustable on a unit lift frame structure. It is a further object to provide such a unit structure which may be quickly and easily moved transversely to facilitate access for servicing without removing ducts and suction door structure.

It is still another object of the present invention to provide an improved cotton conveying structure for a cotton harvester which significantly enhances the serviceability of the row units on the harvester. It is another object to provide such a structure which permits servicing of the units without removing doors and ducts from the units. It is still a further object to provide such a structure in combination with row units which roll transversely on a support frame in order to eliminate the need to unfasten doors and ducts from the units.

It is still another object of the present invention to provide an improved cotton conveying structure in combination with transversely adjustable row units on a cotton harvester wherein the units may be rolled apart for servicing without disconnecting doors or ducts from the units. It is another object to provide such a structure having first and second cotton conveying portions with corresponding outlets and inlets which automatically align with each other as the row units are rolled from service to row harvesting positions. It is yet another object to provide such a structure which eliminates the need for fasteners or other connectors between the first and second conveying portions.

It is still a further object of the present invention to provide an improved cotton conveying structure for a transversely movable row unit wherein the cotton-receiving door support structure is connected to the unit lift frame rather than the row unit so the cotton-receiving door and the duct extending from the door may remain stationary even when the row unit is moved transversely. It is a further object to provide such a structure wherein the row unit automatically aligns with the cotton-receiving door structure when the unit is moved to the harvesting position.

It is still a further object of the present invention to provide an improved cotton conveying structure for a transversely movable row harvesting unit wherein the duct support structure is mounted on the row unit lift frame rather than the cotton-receiving door structure and wherein the duct support structure serves as a transition area for conveying cotton from the door to the duct. It is a further object to provide such a structure wherein the door can move transversely from under the transition area and back into cotton-conveying relationship with the transition area without need for latches or connectors or the like.

It is another object of the present invention to provide an improved cotton conveying system for a narrow-row cotton harvester having transversely movable row unit supported on a transversely extending lift frame, wherein the row units may be transversely moved on the lift frame for servicing of the units without disconnecting ducts or cotton-receiving doors. It is a further object to provide such structure wherein the cotton conveying system includes cotton conveying portions which are movable relative to each other as the row units are moved transversely on the lift frame away from the harvesting positions, and which automatically align as the row units are moved back to the row harvesting positions.

In accordance with the above objects, a cotton harvester is provided with a transversely extending unit support frame having a plurality of row harvesting units adjustably mounted on the frame for transverse movement with respect thereto. The row units include removable panel structure for directing the harvested cotton rearwardly along one side of the units to cotton conveying structure which delivers the cotton from the row units to the harvester basket. The cotton conveying structure on central row units of the harvester includes cotton-receiving suction door structure which is connected directly to the unit support frame rather than to the row unit so that the cotton-receiving door, and the cotton conveying duct extending upwardly from the door to the basket, may remain stationary as the center units are moved transversely to provide access for service. The unit includes a cotton-receiving opening which slides past the fixed unit door opening for servicing and which automatically aligns with the door opening when the unit is returned to the harvesting position. On the outer row units, the cotton-receiving suction door is connected directly to the row unit, and the duct support structure is mounted on the unit support frame. The duct support serves as a transition area between the fixed duct and the cotton conveying door. The cotton-receiving door on the row unit rolls with the row unit from under the transition area without unlatching connectors or the like and, upon return of the row unit to the harvesting position, the door automatically aligns with the transition area. The cotton conveying structure facilitates transverse movement of the row units for servicing and eliminates the time and effort to unfasten doors and ducts.

The removable panel structure provides a narrow compartment structure extending in the fore-and-aft direction alongside tandem picker drums and is easily removable in sections as necessary to provide access to different areas on the row unit. A forward jet post helps direct the cotton rearwardly through the compartment and into the suction door. The row unit configuration in combination with the self-aligning duct and door structures provides an easily accessible and serviceable cotton harvester, even when the row units are narrowly spaced for harvesting narrow row cotton.

These and other objects, features and advantages of the present invention will become apparent to those skilled in the art from the description which follows and from the drawings.

BRIEF DESCRIPTION OF THE DRAWINGS

FIG. 4 is an enlarged side view showing the detail of the suction door support structure for the row unit of FIG. 3.

FIG. 5 is a front view of the duct support structure of FIG. 4 showing the row unit moved transversely with respect to the suction door structure.

DESCRIPTION OF THE PREFERRED EMBODIMENT

Figure 1:
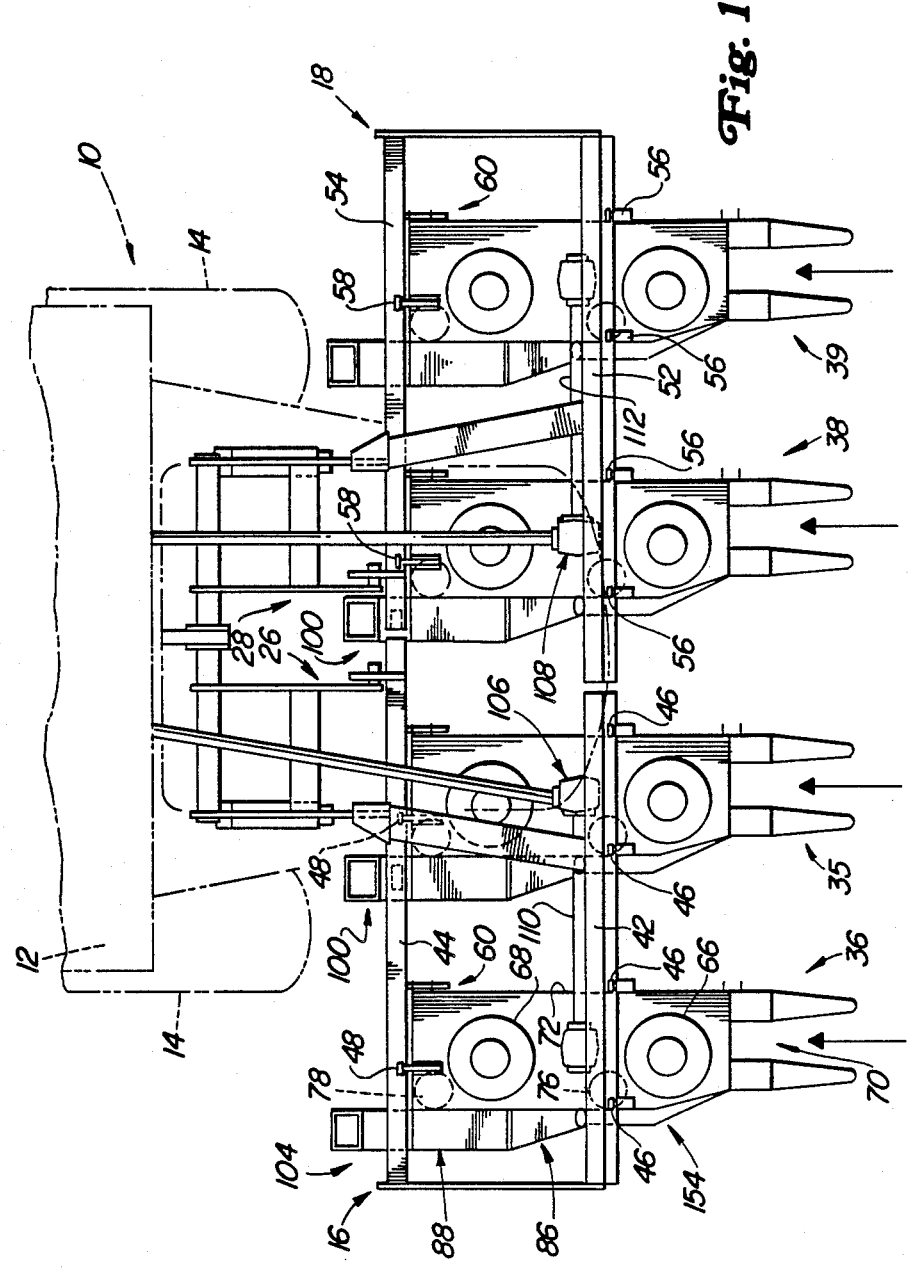
FIG. 1 is a plan view of the forward portion of a cotton harvester with a plurality of row units supported on unit support lift frame and transversely movable on the lift frame for providing access between the units.
Figure 2:
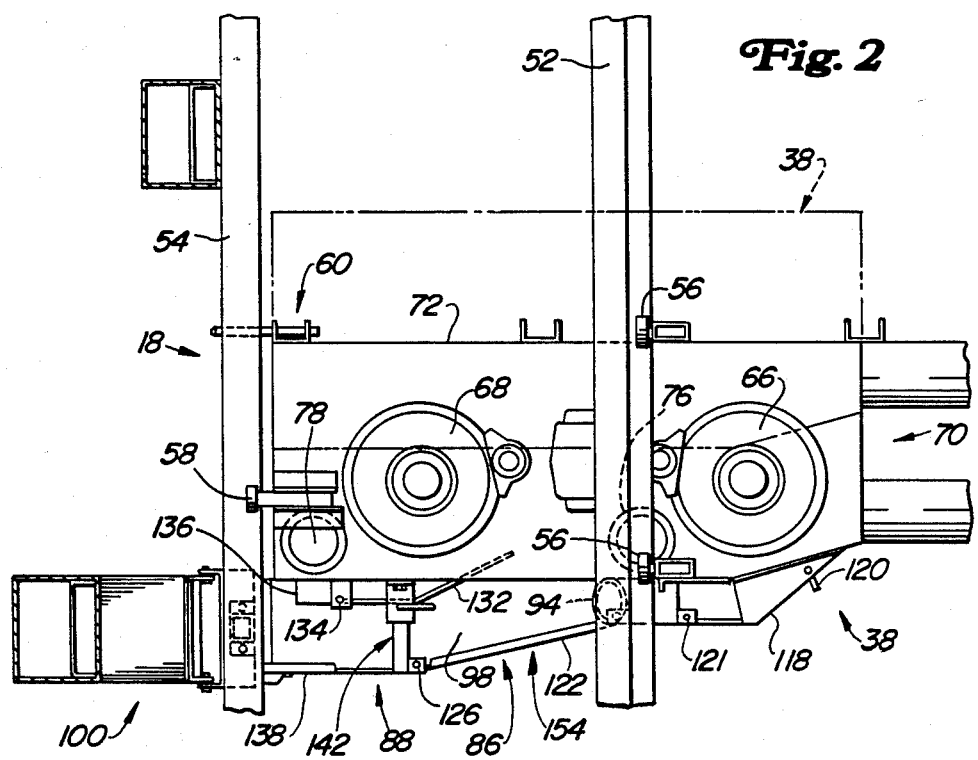
FIG. 2 is an enlarged plan view of an inner row unit of the cotton harvester of FIG. 1.

Referring to FIG. 1, there is shown a cotton harvester 10 having a main frame 12 supported by drive wheels 14 for forward movement over a field planted in parallel rows of cotton. The harvester 10 includes right-hand and left-hand row unit lift frame structures 16 and 18, connected to hydraulically operated lift arm structures 26 and 28, respectively, which rockably connect the lift frame structure to the forward end of the main frame 12. As shown in FIG. 1, a plurality of row units 35, 36 and 38, 39 are supported from the lift frame structures 16 and 18, respectively. The right-hand row unit lift frame structure 16 includes a front transverse beam 42 and a rear transverse beam 44 which support front roller mounts 46 and rear roller mounts 48 with corresponding rollers which rest on the beams 42 and 44, respectively, for suspending the row units from the frame 16 and permitting the row units to be moved laterally to open up space between the units for servicing. Similarly, the left-hand row unit lift frame structure 18 includes front and rear transverse beams 52 and 54 which support front and rear roller mounts 56 and 58 for suspending the row units 38 and 39 from the frame 18 and permitting transverse movement of the row units. For a more detailed discussion of the mounting arrangement for supporting row units for transverse movement on the lift frames, reference may be had to the aforementioned U.S. patent application Ser. No. 087,073. Pin structure 60 (FIGS. 1 and 2) is provided for releasably securing the row units in the harvesting position (FIG. 1).

The harvesting mechanisms for each of the row units 35, 36 and 38, 39 are generally identical and include upright spindle drums 66 and 68 arranged in tandem on one side only of a row receiving area which is indicated generally at 70. The spindle drums 66 and 68 are supported within a row unit housing 72 which also rotatably supports upright doffers 76 and 78 for doffing cotton from the spindles on the drums 66 and 68, respectively, and directing the doffed cotton outwardly and rearwardly toward panel structure 86 and 88, respectively.

A jet post 92 located forwardly of the panel structure 86 includes an inlet 94 for receiving air under pressure from the fan on the harvester and directs a jet of air 96 rearwardly over floor structure 98 at the lower end of the panel structure 86 and 88. On the inboard unit 35 (or 38), the doffed cotton is directed rearwardly into cotton-receiving suction door structure 100 mounted on the unit lift frame 16 (or 18). On the outer row units 36 and 39 a cotton-receiving suction door structure 104 (FIGS. 1 and 6) is connected directly to the aft end of the row unit for movement therewith as the unit is adjusted transversely on the support frame 16 (or 18). The door structures 100 and 104 will be described in detail below.

The harvesting mechanisms in the row units 35, 36 and 38, 39 are driven by drive structures 106 and 108, respectively. Telescoping shafts 110 and 112 connect the inner and outer unit drives so that the row units may be easily adjusted transversely with respect to each other without disconnecting the drives.

Referring now to FIGS. 1-5, the cotton-receiving door structure 100 and the duct structure associated therewith will be described in conjunction with the inner row unit 38 (FIGS. 2-5), it being understood that the configuration of the other inner row unit 35 is generally identical.

The row unit 38 includes a removable front access panel 118 with a securing latch 120. The panel structure 86 includes an outer panel 122 angling outwardly in the rearward direction from the jet post 94. A latch 124 and pin structure 126 releasably secure the panel 122 in position. An inner panel 132 (FIG. 2) is hinged at 134 to an upright structural member 136 and extends forwardly therefrom and inwardly adjacent the rear drum 68 to guide cotton doffed from the forward drum 66 by the doffer 76 outwardly and rearwardly around the drum 68. Cotton doffed by the doffer 78 from the rear drum 68 is directed rearwardly on the opposite side of the panel 132. The panel structure 88 includes a panel 138 extending rearwardly from the panel 122 and releasably secured to the row unit housing by connecting structure indicated generally at 142. The panels 118, 122, and 132 may be pivoted about respective hinge structure or, alternatively, may be easily lifted from the row unit after the corresponding latch structure is released for access to the harvesting mechanisms. The panel structure 88 also includes a downwardly and rearwardly directed panel 148 connected by the structure 142 to the row unit for directing cotton from the forward drum 66 downwardly toward the floor 98 as it moves rearwardly along the panel 132. The panels 138 and 148 are also removable with release of the connecting structure 142.

A rear upright and transversely extending panel 152 (FIG. 5) closes the aft end of the compartment structure (indicated generally at 154) defined by the panel structure 86 and 88 at the side of the row unit 38. A rearwardly directed upright cotton-receiving opening 156 is located at the bottom of the panel 152, and when the row unit is in the harvesting position, is aligned with a mating upright opening 158 in the suction door structure 100. The suction door structure 100 is connected to cotton conveying duct structure 160 which extends rearwardly and upwardly to the cotton harvester basket and supports an air nozzle 162 which directs air upwardly into the duct structure 160 and creates a vacuum at the suction door opening 158.

Cotton harvested by the forward drum 66 is directed rearwardly between the panels 122 and 132 and downwardly by the panel 148 to the opening 156. Cotton harvested by the rear drum 68 is directed rearwardly and outwardly toward the opening 156. The jet of air 96 directed over the floor 98 through the jet post 94, in combination with the suction provided at the opening 158 by the air nozzle 162, direct harvested cotton through the openings 156 and 158 and into the suction door structure 100. The duct structure 160 and air from the nozzle 162 delivers the cotton from the door structure to the cotton basket.

Figure 3:
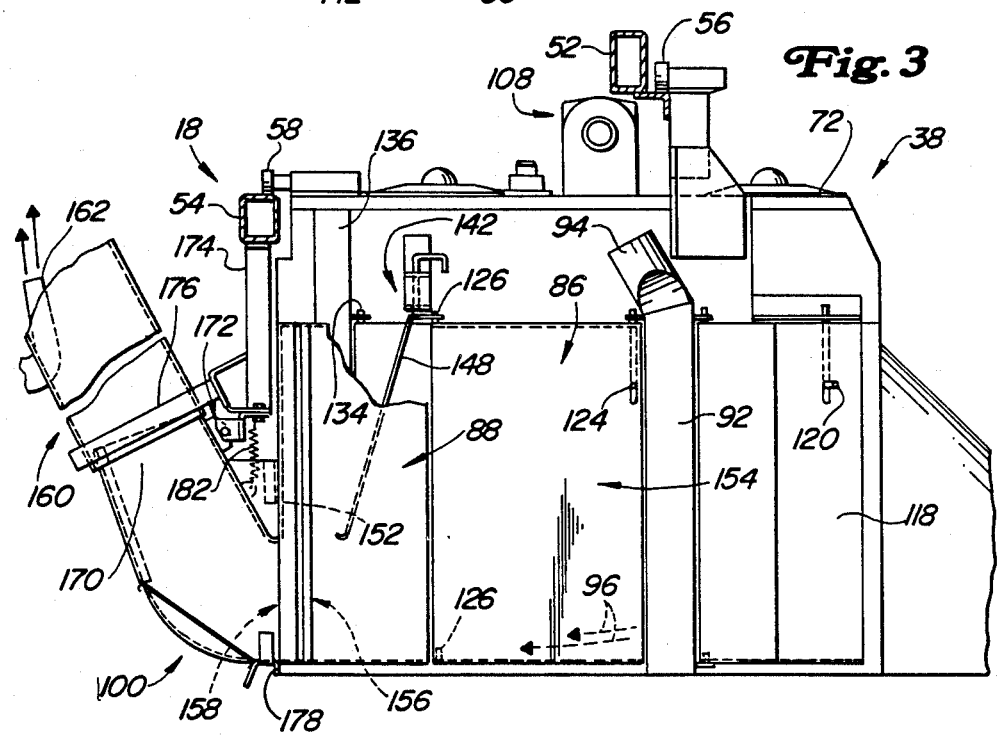
FIG. 3 is a side view of the row unit of FIG. 2.

The suction door structure 100 includes an upper outlet portion 170 insertably received by the opening at the lower end of the duct structure 160 (FIG. 3). The upper outlet portion 170 includes a bracket 172 pivotally connected for rocking about a transversely extending horizontal axis to the lower end of an upright mounting beam 174 which depends from the lower side of the rear transverse beam 54 of the lift frame structure 18. The lower end of the duct structure 160 is also connected by a duct bracket 176 to the lower end of the beam 174. The suction door structure 100 extends downwardly and forwardly from the outlet portion 170 to the opening 158. An angle 178 extends across the lower edge of the opening 158. A spring 182 is tensioned between the lower end of the beam 174 and the central portion of the suction door structure 100 to pivot the door structure 100 about the transverse axis toward the aft end of the compartment structure 154.

A flange 186 (FIG. 5) is provided at the lower end of the panel 152 and mates with the front flange of the angle 178 at the bottom of the suction door 100. The spring 182 biases the suction door structure 100 about the transverse pivot to maintain close registry between the door structure and the back of the compartment structure 154. The front face of the suction door structure 100 defining the opening 158 substantially conforms to the rear face of the panel 152 defining the opening 156 so that a relatively airtight connection between the openings is provided when the row unit 38 is rolled to its harvesting position.

An adjustable panel 188 (FIG. 5) is connected near the upper end of the opening 158 and is movable vertically to adjust the size of the opening 158 for optimum operation. A cleanout door 192 is hinged to the angle 178 for providing access to the cotton-receiving openings 156, 158 without need to move the row unit 38 transversely.

When the operator wishes to gain access to the row unit harvesting structure, he pulls the pin on the pin structure 60 to release the row unit 38 and thereafter rolls the unit 38 on the beams 52 and 54. The rear panel structure 152 and corresponding opening 156 slide transversely with respect to the suction door structure 100 and suction door opening 158 (FIG. 5) which are supported against transverse movement on the support beam 74. Preferably, as best seen in FIG. 5, the rear panel 152 remains in slightly overlapping relationship with the suction door structure 100 when the row unit 38 is in the service position (broken lines of FIG. 2) to prevent the suction door structure 100 from pivoting about the transverse axis into interfering relationship with the transverse rolling of the row unit 38. The operator may selectively pivot or remove any or all of the panels of the compartment structure 154 to gain access to the harvesting mechanisms on the row unit 38. Since the compartment structure 154 is fabricated from several easily removable or swingable panels, access may be had without removing large, cumbersome door structure. Also, the row unit may be rolled without spending time unfastening doors and ducts. Once servicing is complete, the operator simply rolls the row unit 38 back to the harvesting position and reinserts the pin of the pin structure 60 to lock the row unit against transverse movement. The cotton-receiving door structure 100 automatically aligns with the opening 156 in the rear panel structure 152 as the row unit 38 is rolled back into the harvesting position.

Figure 6:
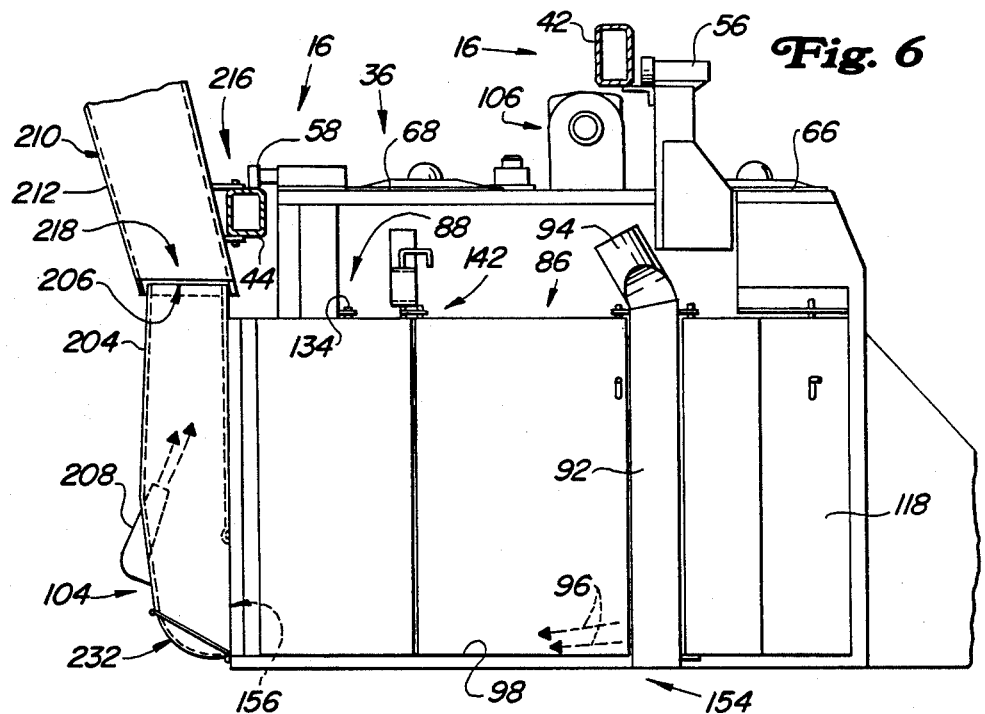
FIG. 6 is a side view of an outer row unit of the harvester of FIG. 1 showing the transition area provided between the duct structure which is mounted on the unit lift frame and the suction door mounted on the row unit.
Figure 7:
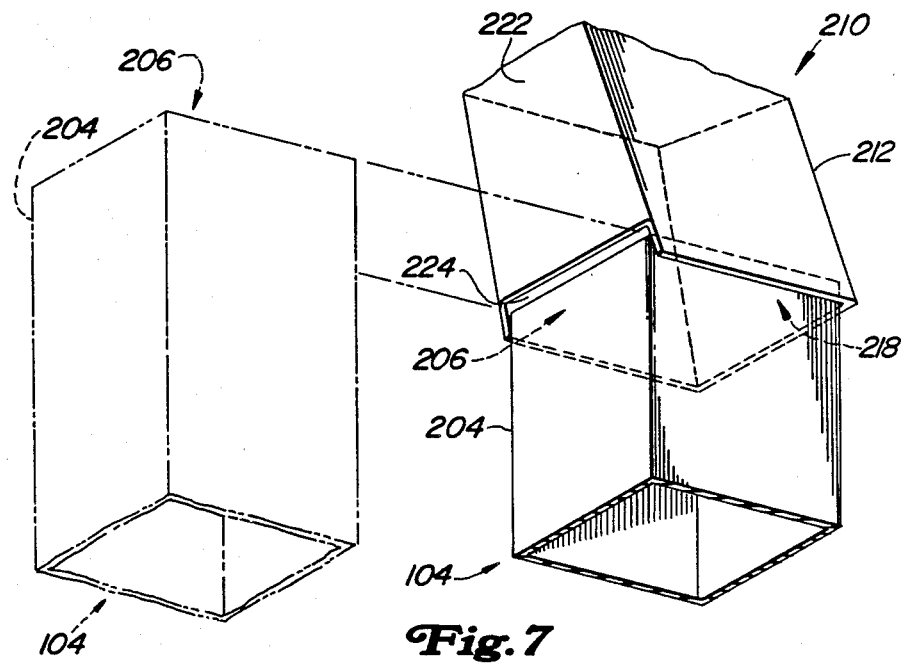
FIG. 7 is an enlarged perspective view of the transition area of FIG. 6 and showing the relative movement of the upper door structure relative to the lower duct portion.

Referring now to FIGS. 1, 6 and 7, the outer row unit cotton conveying structure including the cotton-receiving suction door structure 104 will be described in detail with reference to the row unit 36. The panel structure defining the compartment structure 154 is generally identical to that previously described for the row unit 38 and so will not be discussed in detail here. However, the suction door structure 104 is connected directly to the aft end of the row unit 36 rather than being independently supported from the lift frame structure as was the case with the suction door structure 100 for the row unit 38. The suction door structure 104 includes upper door structure 204 which extends upwardly above the panel structure 154 at the aft end of the row unit 36. The upper door structure 204 includes an upwardly opening outlet 206 rectangular in configuration. A nozzle 208 opens upwardly at the lower end of the door structure 204 to direct air toward the outlet 206 and create a vacuum at the lower end of the door structure 104 adjacent the opening 156. Cotton conveying duct structure 210 extends upwardly from the upper door structure 204 to the cotton basket. The cotton conveying duct structure 210 includes a lower duct portion 212 supported on the rear transverse beam 44 of the lift frame 16 by bracket structure 216. The lower duct portion 212 serves as a transition area for conveying cotton from the suction door structure 104 to the duct structure 210. The lower duct portion 212 includes an inlet 218 adapted to align with the outlet 206 when the row unit 36 is in the harvesting position (solid lines of FIG. 7). The lower duct portion 212 is generally rectangular in configuration and slightly larger than the outlet 206. The area adjacent the inlet 218 includes an outer sidewall 222, the lower section of which is cut away at 224 to permit the door structure 204 to slide transversely into and out of registry with the lower duct portion 212 with the remaining walls generally encompassing the upper edges of the three corresponding walls of the upper door structure 204. The upper edges of the upper door structure 204 extend a fraction of an inch below the edge of the cutaway 224 to permit the door structure 204 to move freely into and out of registry with the duct portion 212. The overlap of the lower duct portion 212 at three remaining sides provides a relatively uninterrupted path between the door structure 104 and the duct structure 210.

When the operator wishes to service the row unit 36 or the adjacent row unit 35, he releases the pin on the pin structure 60 of the row unit 36 and rolls the row unit 36 outwardly along the beams 42 and 44 of the lift frame 16. The suction door structure 104 moves with the row unit away from under the cotton conveying duct structure 210, the lower end of which is fixed with respect to the beam 44. The cutaway 224 in the outer sidewall 222 of the lower duct portion 212 permits the outlet 206 to be moved into and out of registry with the inlet 218 as the row unit 36 is rolled on the lift frame 16. Therefore, the operator can service the units without having to disconnect the ducts or without having to unlatch or operate other connecting structure between the suction door structure 104 and the cotton conveying duct structure 210. After servicing, the row unit 36 is rolled inwardly to the harvesting position wherein the outlet 206 aligns with the inlet 218. The nozzle 208 creates a suction at the opening 156 which, in combination with the jet of air 96 provided by the jet post 92, moves the cotton through the opening and upwardly to the upper door structure 204. The air from the nozzle 208 directs the cotton through the transition area at the lower end of the duct portion 212 and upwardly into the duct structure 210. A cleanout door 232 is provided at the lower end of the suction door structure 104 to provide access to the area around the opening 156 without need to move the row unit 36 transversely on the lift frame 16.

Having described the preferred embodiment, it will be apparent that modifications can be made without departing from the scope of the invention as defined in the accompanying claims.

We claim:

1. In a cotton harvester having a frame supported on ground wheels for forward movement over a field with parallel rows of cotton plants, a cotton basket, a row unit support structure mounted at the forward end of the frame, a plurality of row harvesting units including spindle means for removing cotton from the plants and doffer means for doffing the cotton from the spindles, means for supporting the row harvesting units on the support structure including means for moving at least one of the row units transversely from a rowharvesting position to an access position for providing access to the row units for servicing, conveying structure for receiving cotton from the row units and directing the cotton to the basket, said conveying structure including a first conveying portion having an outlet, and means connecting the first conveying portion to said at least one of the row units for movement transversely therewith, a second conveying portion located downstream of the first conveying portion and supported independently of the first conveying portion, the first conveying portion moving out of cotton conveying relationship with respect to the second conveying portion as the row unit is moved to the access position, said second conveying portion including an inlet adapted for moving into cotton conveying relationship with the outlet of the first conveying portion when the row unit is moved from the access position to the row-harvesting position.

2. In a cotton harvester having a frame supported on ground wheels for forward movement over a field with parallel rows of cotton plants, a cotton basket, a row unit support structure mounted at the forward end of the frame, a plurality of row harvesting units including spindle means for removing cotton from the plants and doffer means for doffing the cotton from the spindles, means for supporting the row harvesting units on the support structure including means for moving at least one of the row units from a row-harvesting position to an access position for providing access to the row units for servicing, conveying structure for receiving cotton from the row units and directing the cotton to the basket, said conveying structure including a first conveying portion having an outlet, and means connecting the first conveying portion to said at least one of the row units for movement therewith, a second conveying portion located downstream of the first conveying portion and supported independently of the first conveying portion so that the first conveying portion moves with respect to the second conveying portion, said second conveying portion including an inlet adapted for alignment with the outlet of the first conveying portion when the row unit is in the row-harvesting position, and means for automatically aligning the outlet of the first portion with the inlet of the second portion as the row unit is moved from the access position to the row-harvesting position, and wherein the first conveying portion comprises compartment structure located on the row unit, and the second conveying portion comprises a suction door structure supported from the row unit support structure.

3. The invention as set forth in claim 2 wherein the compartment structure includes upright panel structure with a lower cotton-receiving opening, and wherein the second conveying portion comprises a mating opening, and means for biasing the first and second conveying portions into contact with each other to define a generally uninterrupted cotton conveying area between the first and second conveying portions.

4. The invention as set forth in claim 3 including means pivotably connecting the second conveying portion to the row unit support structure and spring means for biasing the second portion about the pivotal connection toward the first portion.

5. The invention as set forth in claim 2 wherein the compartment structure comprises removable panel structure located on one side of the row unit and extending in the fore-and-aft direction for defining a fore-and-aft extending cotton path extending from the spindle means to the outlet of the first conveying portion.

6. The invention as set forth in claim 5 wherein the removable panel structure is pivotally connected to the row unit.

7. The invention as set forth in claim 5 including means for introducing a jet of air from the forward end of the cotton path toward the outlet of the first conveying portion.

8. The invention as set forth in claim 7 wherein the means for introducing a jet of air comprises an upright post and means for hingedly connecting at least a portion of the removable panel structure form the post.

9. In a cotton harvester having a frame supported on ground wheels for forward movement over a field with parallel rows of cotton plants, a cotton basket, a row unit support structure mounted at the forward end of the frame, a plurality of row harvesting units including spindle means for removing cotton from the plants and doffer means for doffing the cotton from the spindles, means for supporting the row harvesting units on the support structure including means for moving at least one of the row units from a row-harvesting position to an access position for providing access to the row units for servicing, conveying structure for receiving cotton from the row units and directing the cotton to the basket, said conveying structure including a first conveying portion having an outlet, and means connecting the first conveying portion to said at least one of the row units for movement therewith, a second conveying portion located downstream of the first conveying portion and supported independently of the first conveying portion so that the first conveying portion moves with respect to the second conveying portion, said second conveying portion including an inlet adapted for alignment with the outlet of the first conveying portion when the row unit is in the row-harvesting position, and means for automatically aligning the outlet of the first portion with the inlet of the second portion as the row unit is moved from the access position to the row-harvesting position, and wherein the first conveying portion comprises a suction door fixed to the row unit for movement therewith, and the second conveying portion comprises cotton conveying duct structure supported from the row unit support structure.

10. The invention as set forth in claim 9 wherein the cotton conveying duct structure comprises a lower duct portion connected to the row unit lift support structure and the suction door structure comprises upper door structure transversely movable into alignment with the lower duct portion upon movement of the row unit to the harvesting position.

11. The invention as set forth in claim 10 including means for providing a gap between the lower duct portion and upper door structure for permitting the upper duct structure to move with respect to the lower duct portion.

12. The invention as set forth in claim 11 wherein the upper duct structure includes a wall portion overlapping the upper door structure when the row unit is in the row-harvesting position.

13. A row unit for a framed cotton harvester, comprising:
a row unit housing supported by the harvester frame and defining a fore-and-aft extending row-receiving area;
forward and rearward upright cotton picking spindle drums supported on one side only of the row-receiving area for harvesting the cotton from a row of cotton plants;
means for doffing cotton from the spindle drums and directing the cotton rearwardly;
fore-and-aft extending upright compartment structure located adjacent the means for doffing and adapted for receiving the cotton doffed from both of the drums, the compartment structure including floor structure and an outer panel extending upwardly from the floor structure;
guide means located between the drums for directing the cotton doffed from the forward drum away from the rearward drum and toward the outer panel as the cotton moves rearwardly in the compartment structure;
door structure located at the aft end of the compartment structure and including an opening for receiving the cotton from the compartment; and
means for introducing a jet of air at the lower forward end of the compartment and directing the air rearwardly over the floor structure toward the opening to propel the doffed cotton therethrough.

14. The invention as set forth in claim 13 including means supporting the door structure from the row unit, and nozzle means for directing a jet of air into the door structure for creating a vacuum at the opening which cooperates with the jet of air to propel cotton through the opening and into the door structure.

15. The invention as set forth in claim 13 wherein the guide means comprises an upright panel supported adjacent the rear drum, said upright panel angling outwardly in the rearward direction toward the outer panel structure.

16. The invention as set forth in claim 15 wherein the outer panel angles outwardly in the rearward direction from a location adjacent the means for introducing a jet of air.

17. The invention as set forth in claim 13 wherein the guide comprises panel structure swingably and removably connected to the row unit housing.

18. A row unit for a framed cotton harvester, comprising:
a row unit housing supported by the harvester frame and defining a fore-and-aft extending row-receiving area;
forward and rearward cotton picking spindle drums supported on one side only of the row-receiving area;
means for doffing cotton from the spindle drums;
fore-and-aft extending compartment structure located adjacent the means for doffing and adapted for receiving the doffed cotton;
door structure located at the aft end of the compartment structure and including an opening for receiving the cotton from the compartment;
means for introducing a jet of air at the forward end of the compartment and directing the air rearwardly toward the opening to propel the doffed cotton therethrough;
means for supporting the door structure from the harvester frame independently of the row unit housing; and
means for supporting the row unit from the harvester frame for transverse movement with respect thereto into and out of cotton conveying relationship with the compartment structure.

19. A row unit for a framed cotton harvester, comprising:
a row unit housing supported by the harvester frame and defining a fore-and-aft extending row-receiving area;
forward and rearward cotton picking spindle drums supported on one side only of the row-receiving area;
means for doffing cotton from the spindle drums;

fore-and-aft extending compartment structure located adjacent the means for doffing and adapted for receiving the doffed cotton;

door structure located at the aft end of the compartment structure and including an opening for receiving the cotton from the compartment;

means for introducing a jet of air at the forward end of the compartment and directing the air rearwardly toward the opening to propel the doffed cotton therethrough;

means supporting the door structure from the row unit;

nozzle means for directing a jet of air into the door structure for creating a vacuum at the opening which cooperates with the jet of air to propel cotton through the opening and into the door structure; and duct structure having an inlet supported from the harvester frame, wherein the door structure includes an outlet adapted for alignment with the duct structure inlet, and means for moving the row unit housing with respect to the harvester frame and duct structure between a harvesting position wherein the inlet and outlet move into cotton conveying relationship, and an access position wherein the outlet is offset from the inlet.

* * * * *